US006962782B1

(12) United States Patent
Livache et al.

(10) Patent No.: US 6,962,782 B1
(45) Date of Patent: Nov. 8, 2005

(54) METHOD FOR PRODUCING ADDRESSED LIGANDS MATRIXES ON A SUPPORT

(75) Inventors: Thierry Livache, Haute Jarrie (FR); Frédéric Lesbre, St. Egiere (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/890,261

(22) PCT Filed: Feb. 8, 2000

(86) PCT No.: PCT/FR00/00289

§ 371 (c)(1),
(2), (4) Date: Aug. 7, 2001

(87) PCT Pub. No.: WO00/47317

PCT Pub. Date: Aug. 17, 2000

(30) Foreign Application Priority Data

Feb. 8, 1999 (FR) .................................. 99 01438

(51) Int. Cl.[7] .......................... C12Q 1/68; C12M 1/00; G01N 15/06; C07M 21/04

(52) U.S. Cl. ......................... 435/6; 435/7.1; 435/174; 435/283.1; 435/287.2; 536/23.1; 536/25.3; 422/68.1; 422/100

(58) Field of Search .................... 435/4, 6, 7.1, 174, 435/283.1, 287.2; 536/25.3, 23.1; 422/68.1, 422/10, 100

(56) References Cited

U.S. PATENT DOCUMENTS

| 5,474,796 A | * | 12/1995 | Brennan ..................... 427/2.13 |
| 5,486,337 A | * | 1/1996 | Ohkawa ..................... 422/100 |
| 5,810,989 A | * | 9/1998 | Krihak et al. ................ 205/91 |
| 5,828,133 A | | 10/1998 | Caillat et al. |
| 5,837,859 A | * | 11/1998 | Teoule et al. .............. 536/25.3 |
| 6,083,763 A | * | 7/2000 | Balch ......................... 436/518 |
| 6,468,785 B1 | * | 10/2002 | Wang et al. ............. 435/287.2 |

FOREIGN PATENT DOCUMENTS

| GB | 2 319 838 | 6/1998 |
| WO | WO 94/22889 | 10/1994 |
| WO | WO 97/49987 | 12/1997 |
| WO | WO 98/01221 | 1/1998 |
| WO | WO 98/58745 | 12/1998 |

OTHER PUBLICATIONS

New Riverside University Dictionary, Riverside Publishing Co., Boston, 1984, p. 388.*

(Continued)

*Primary Examiner*—B J Forman
(74) *Attorney, Agent, or Firm*—Oblon, Spivak, McClelland, Maier & Neustadt, P.C.

(57) ABSTRACT

A method for fabricating matrices of addressed ligands on a carrier. In the method, an element is used such as a reservoir filled with ligand and containing an electrode to deposit and electrochemically fix the ligand to the conductive carrier. The ligand may be an oligonucleotide or a peptide, and fixing may be obtained by electrocopolymerisation of this oligonucleotide or peptide carrying a pyrrole group at 5' with pyrrole.

23 Claims, 3 Drawing Sheets

OTHER PUBLICATIONS

T. Livache, et al., Biosensors & Bioelectronics, vol. 13, pp. 629-634, "Electroconducting Polymers for the Construction of DNA or Peptide Arrays on Silicon Chips," 1998.

S. P. A. Fodor, et al., Science, vol. 251, pp. 767-773, "Light-Directed, Spatially Addressable Parallel Chemical Synthesis," Feb. 1991.

K. R. Khrapko, et al., J. DNA Sequencing and Mapping, vol. 1, pp. 375-388, "A Method for DNA Sequencing by Hybridization with Oligonucleotide Matrix," 1991.

T. Livache, et al., Nucleic Acids Research, vol. 22, No. 15, pp. 2915-2921, "Preparation of a DNA Matrix via an Electrochemically Directed Copolymerization of Pyrrole and Oligonucleotides Bearing a Pyrrole Group," 1994.

S. A. Emr, et al., Electroanalysis, vol. 7, No. 10, pp. 912-923, "Use of Polymer Films in Amperometric Biosensors," 1995.

T. Livache, et al., Analytical Biochemistry, vol. 255, pp. 188-194, "Polypyrrole DNA Chip on a Silicon Device: Example of Hepatitis C Virus Genotyping," 1998.

Patent Abstracts of Japan, JP 7-213926, Aug. 15, 1995.

* cited by examiner

METHOD FOR PRODUCING ADDRESSED LIGANDS MATRIXES ON A SUPPORT

This is a 371 of PCT/FR00/00289, filed Feb. 8, 2000.

TECHNICAL FIELD

The subject of the present invention is a method for producing matrices of addressed ligands on a carrier.

The ligands may be natural or synthetic products having biological activity or an affinity for biological or other molecules, for example peptides, oligonucleotides, receptors or other molecules of biological interest. Matrices of this type may find numerous applications, in particular for the detection and identification of constituents in biological samples and for screening molecule libraries. Such matrices may in particular be matrices of oligonucleotide probes.

PRIOR ART

In the past few years several methods have been developed for producing matrices of this type. Three methodologies are known in which addressing is made either by photochemical route, or by mechanical route, or by electrochemical route.

In the document by Fodor S. et al, Science, 1991, 251, pages 767–773 [1] a method is described for making a matrix of oligonucleotides by photochemical addressing. According to this method, a carrier is used functionalised by functional groups protected by photolabile protector groups; these protector groups are then removed by radiation through a mask on the sites which are to be coupled to the molecules of biological interest, then these molecules are coupled to the de-protected functional groups.

This mode of photochemical addressing has the disadvantage of requiring a large number of different masks to carry out all the coupling operations.

The documents: Khrapko K. R. et al, DNA Sequence—I.DNA Sequencing and Mapping, 1991, volume 1, pages 375 to 388 [2] and GB-A-2 319 838 [3] describe a method for producing matrices by mechanical addressing. In document [2] a carrier is used which is coated with a polyacrylamide gel that is activated by substituting certain amide groups by hydrazide groups. The oligonucleotides activated in aldehyde form are then fixed to the hydrazide groups by micropipetting the oligonucleotide solutions onto the sites to which they are to be coupled.

In document [3] a carrier is used which is functionalised by reagent groups and coupled to identical biological molecules. The carrier is then cut into individual plaques each one corresponding to the coupling of a molecule and then several plaques carrying different molecules at desired sites are subsequently assembled on a plate.

The use of these mechanical addressing techniques has the disadvantage of having to bring the molecule to be fixed directly to the site to be addressed. Therefore the size of the site cannot be smaller than the size of the drop of dispensed reagent. Also, the process requires two phases which are respectively a dispensing phase and then a covalent attachment phase. Also the carrier has to be modified such that a covalent bond may be formed between the carrier and the molecule to be fixed.

The documents: Livache T. et al, Nucleic Acids Res., 1994, 22, 15, pages 2915–2921 [4] and WO-A-94/22889 [5] describe electrochemical addressing techniques to produce matrices of biological products.

In this case a carrier is used which comprises several electrodes and these electrodes are used to fix the biological molecules by electrochemical route. For this purpose, the carrier fitted with its electrodes is immersed in a solution containing the molecule to be fixed, and by activation of the desired electrodes they are coated with the molecule by electrochemical route. On this account, the deposits of molecules can only be made in successive manner. Moreover, it is necessary to use a carrier carrying electrodes that can be individually addressed, therefore complex systems that are possibly multiplexed.

The subject of the present invention is precisely a method for producing matrices of biological products on a carrier, which remedies the disadvantages of the above-mentioned methods and with which it is possible in addition to conduct the addressing and fixing of the biological molecule in a single step, without requiring prior functionalisation of the carrier.

DESCRIPTION OF THE INVENTION

For this purpose, the invention puts forward a method for producing a matrix containing at least one ligand fixed by electrochemical route to a conductive carrier or to conductive zones of a carrier, in which at least one element is used able to dispense the ligand or ligands coupled to an electropolymerisable monomer serving as electrode to achieve electrically assisted synthesis of a polymer carrying the ligand or ligands on the conductive carrier or on the conductive zones of the carrier.

According to the invention, an element is therefore used as electrode which is able to dispense the ligand or ligands. This element may be made up of a reservoir containing the ligand coupled to the electropolymerisable monomer and comprising a conductive part, or it may simply be formed of an electrode in the form of a wire or needle which, after immersion in a container containing the ligand to be fixed coupled to the electropolymerisable monomer, is charged with this ligand by capillarity.

By using an electrode formed of said element according to the invention, it is possible to place the ligand in contact with the conductive carrier or the conductive zones of the carrier, then to fix it directly to the conductive carrier (or the conductive zone) by electrochemical activation, for example by setting up a potential difference or by generating a current between the conductive carrier (or the conductive zone) and the element acting as electrode.

Therefore the dispensing and fixing of the ligand to the carrier is conducted in a single step.

According to a first embodiment of the invention, said element comprises a reservoir filled with the ligand and comprising an insulating dispenser nozzle and at least one electrode arranged in said reservoir, said nozzle being in direct contact with the conductive carrier or at least one conductive zone of the carrier, during the fixing operation.

The nozzle may in particular be a capillary tube which is directly placed on the conductive surface.

According to a second embodiment of the invention, said element comprises a reservoir filled with ligand, and comprising a conductive dispenser nozzle, the contact between the conductive nozzle and the conductive carrier or at least one conductive zone of the carrier being assured via a drop of ligand leaving the nozzle during the fixing operation.

In this case, the conductive nozzle is not in contact with the conductive carrier or the conductive zone. As previously, the conductive nozzle may be formed of a capillary tube.

According to a third embodiment of the invention, said element is formed of an electrode in wire or needle form, charged externally with ligand coupled to the electropolymerisable monomer, the contact between the electrode and the conductive carrier or a conductive zone of the carrier being assured during the fixing operation by a drop of ligand withheld by the electrode.

In the different embodiments described above, the reservoir generally contains a solution of ligand to be fixed and reagent(s) that may optionally be needed to ensure fixing of the ligand by electrochemical route.

According to the invention, the electrochemical fixing of the ligand is made in particular by coupling it to an electropolymerisable monomer. In this case, the solution may contain the ligand coupled to the electropolymerisable monomer, the electropolymerisable monomer and optionally a doping agent.

The elctropolymerisable monomer may in particular be one of those described by Emr S. and Yacynych A., Electroanalysis, 1995, 7, pp. 913–923 [7]. They may belong to two categories, those leading to conductive polymers such as pyrrole, aniline, thiophene. and their derivatives, and those leading to insulating polymers such as derivatives of phenyl or benzene.

In this case, fixing of the ligand is achieved by electrocopolymerisation of the monomer and of the ligand coupled to the monomer.

The ligand may for example be an oligonucleotide, a nucleotide, an amino acid or a peptide.

Said method of electrochemical fixing is described in document [5] for ligands which are an oligonucleotide or a nucleotide.

In this latter case, after conducting fixation, the chain of the fixed oligonucleotide or nucleotide can be lengthened through application of conventional synthesis methods for oligonucleotides by successive coupling of the desired nucleotides, but by conducting electrochemical de-protection of the last nucleotide fixed.

In respect of peptides, it is possible to use the same technique to lengthen the chain of the peptide by coupling the desired amino acids.

The use of the electrodes described above to achieve the depositing and fixing of a ligand by electrochemical route has the following advantages:

The depositing and fixing procedure is carried out in a single step and it is very rapid.

This technique is easy to implement since it simply uses a mechanical depositing technique, for example transfer using a micropipette, but it is coupled to the space resolution possibilities of electrochemistry.

With this technique it is possible to carry out several deposits in parallel mode.

Also, this method does not require the use of modified carriers or which carry individually addressable electrodes.

For carriers in conductive material, these may be made entirely in an electrically conductive material or they may be made of an insulating material coated with a layer of conductive material.

The conductive materials which can be used may be of different types, they may for example be metals such as gold, silver and platinum, or conductive oxides such as indium and tin oxide (ITO), carbon or conductive organic polymers.

If the carrier comprises conductive zones, these may be made in the conductive materials cited above and arranged on an insulating carrier.

The insulating carrier may for example be in glass, silicon or plastic material. It is also possible to use a carrier in a conductive material whose conductive zones are delimited by depositing an insulating material on the surface of the conductive material.

According to the invention, the conductive zones may be electrically interconnected or electrically addressable either individually or in groups so that they can be activated separately.

The method of the invention may be implemented such as to fix identical or different ligands on different conductive sites of the carrier.

In this case, simultaneous or successive fixing of identical or different ligands may be made using several elements respectively dispensing identical or different ligands. In this case, at least two of the elements may be grouped together to form a print head.

According to one variant of the invention, successive fixing is made of at least two different ligands to different sites of the carrier using a single element but by changing the ligand dispensed by this element at least once.

In all the embodiments described above, the main advantage lies in the ligand dispensing-coupling process which enables the production of carriers carrying addressed molecules in extremely fast manner.

A further subject of the invention is a device for producing a matrix of ligands on a conductive carrier or on conductive zones of a carrier, comprising:

at least one ligand dispensing means provided with a conductive part, means for connecting firstly the conductive carrier or the conductive zones of the carrier, and secondly the conductive part of the dispensing means to an electric generator, and means for positioning and/or moving the carrier and/or the dispensing means, relative to one another and to place them in contact such as to make several deposits of ligands on the carrier at different sites.

According to the invention, the dispensing means may comprise a reservoir containing the ligand and at least one electrode arranged in said reservoir and forming the conductive part of said means.

According to one particular arrangement, the device comprises several ligand dispensing means assembled in the form of a print head.

According to one variant of embodiment, the device for producing a matrix of ligands on a conductive carrier or conductive zones of a carrier, comprises:

an electrode in the form of a wire or needle able to be charged externally with said ligand, means for connecting firstly the conductive carrier or the conductive zones of a carrier, and secondly the electrode to an electric generator, and means for positioning and/or moving the carrier and/or the electrode relative to one another such as to make several deposits of ligands on the carrier at different sites.

Other characteristics and advantages of the invention will become clearer on reading the following description which is evidently given for illustrative purposes and is non-restrictive, with reference to the appended drawings.

DETAILED DISCLOSURE OF THE EMBODIMENTS

Figure 1:
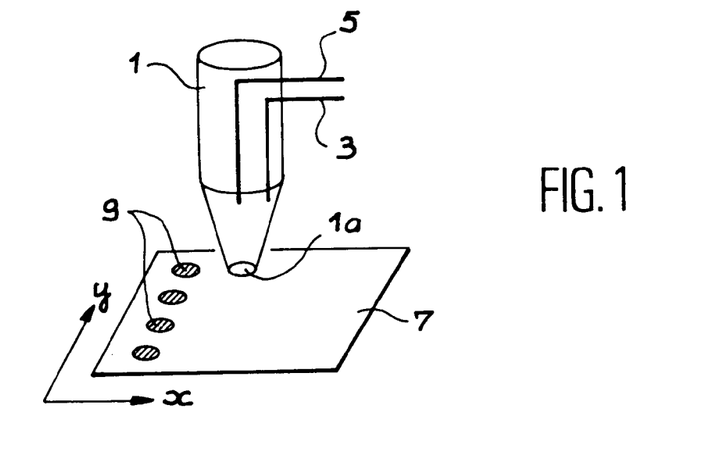
FIG. 1 is a diagram of an element comprising a ligand dispensing reservoir and at least one electrode to fix the ligand to a conductive carrier.

FIG. 1 shows the first embodiment of the invention in which as electrode an element is used comprising a reservoir 1 filled with the ligand to be fixed and comprising a dispensing nozzle 1a. Inside reservoir 1 are arranged a counter-electrode 3 made in platinum or gold for example, and a control electrode 5.

The reservoir may contain a sufficient volume of reagent to carry out a certain number of deposits, which may for example reach one thousand.

In this first embodiment shown in FIG. 1, a conductive carrier 7 is used which may comprise a glass substrate coated with a gold layer.

This figure shows the deposits 9 made with said reservoir by moving the carrier along directions x and y for example between two deposits. If the nozzle 1a of the reservoir, in the form of a capillary tube for example, is made in an insulating material it can be placed on the conductive carrier 7 and, by setting up a difference in potential or current between conductive surface 7 and the counter-electrode 3, it is possible to obtain deposits 9 which are fixed to the conductive surface 7 by electric impulse. In this case, the size of the deposits 9 is determined by the size of the reservoir/carrier interface located in the lines of the electric field between the electrode and the conductive surface. This interface must be as small as possible to reduce the size of the deposit obtained.

The reservoir in FIG. 1 may also comprise a nozzle 1a in conductive material. In this case, fixing of the ligand present in the reservoir is made by contacting the conductive surface 7 with the electrode formed by nozzle 1a by means of a drop leaving nozzle 1a. In this case the size of the deposits is also adjusted by the interface between the liquid and the conductive surface located in the lines of the electrical field.

Figure 2:
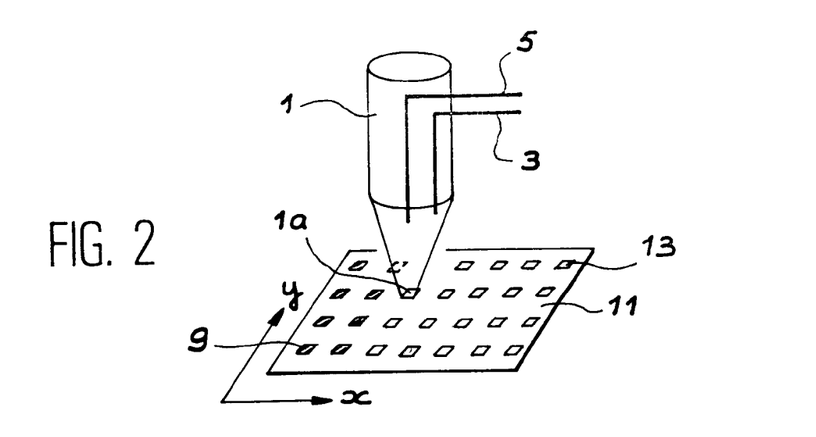
FIG. 2 shows an element similar to the one in FIG. 1 to achieve fixing of a ligand to a conductive carrier provided with conductive zones that are electrically interconnected.

The resolution of the deposits 9 may be improved by using a carrier as shown in FIG. 2 formed of interconnected conductive zones. In FIG. 2 the same references have been used as in FIG. 1 to designate the reservoir 1 fitted with its nozzle 1A, a control electrode 5 and a counter-electrode 3. In this case the carrier is formed of an insulating carrier provided with conductive zones 13 insulated from each other but electrically interconnected. These conductive zones may be made in gold on a glass or silicon substrate for example. In this case, deposits 9 are obtained by dispensing the ligand above the conductive zones, but only the conductive zones in contact with the ligand can be coated with the latter. Therefore the size of the deposits is adjusted by the size of the conductive zones 13.

In this case, the conductive carrier used in fact only comprises a single electrode; this immensely simplifies its production and the costs involved may be very low since simple sheets of plastic material coated with conductive material may be used.

The use of a network of conductive zones makes it possible to reduce the size of the deposits 9, but not to increase the density of the matrix. This density is directly dependent upon the size of the interface between the capillary nozzle 1a and the carrier and it is limited by the size of the nozzle.

Figure 3:
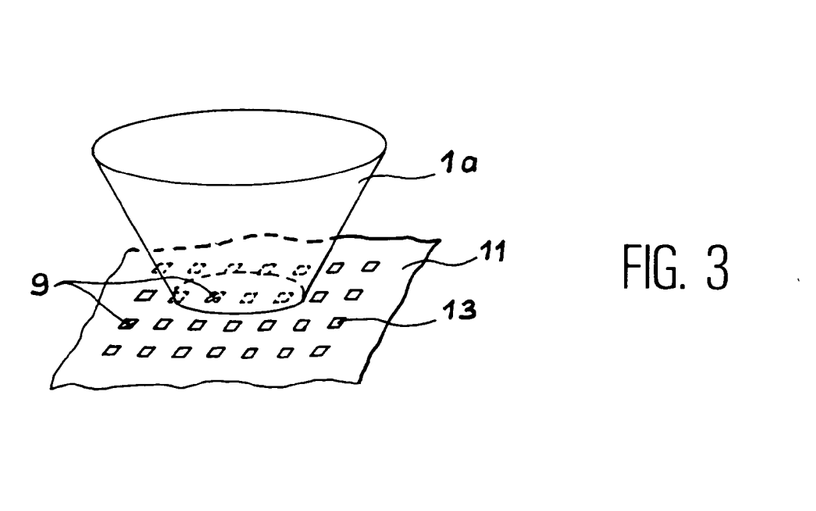
FIG. 3, on an enlarged scale, shows the nozzle of the dispensing reservoir in FIG. 1, to carry out fixing of the ligand on a carrier comprising multiplexed conductive zones.

It is nonetheless possible to increase the density of the matrix by using a carrier comprising conductive zones forming multiplexed electrodes, as shown in FIG. 3.

FIG. 3 illustrates the nozzle 1a of the reservoir 1 in FIGS. 1 and 2 on an enlarged scale and part of an insulating conductive carrier 11 provided with conductive zones 13 which are separately connected to means for applying a potential or current so that they can be activated separately. In this case, the size of the deposits is determined by the size of the activated conductive zones 12 as shown in the case in FIG. 3. The other conductive zones which are in contact with the ligand cannot lead to fixing of the ligand since they are not electroactivated. In this manner, it possible to simultaneously achieve high space resolution and strong matrix density.

Figure 4A:
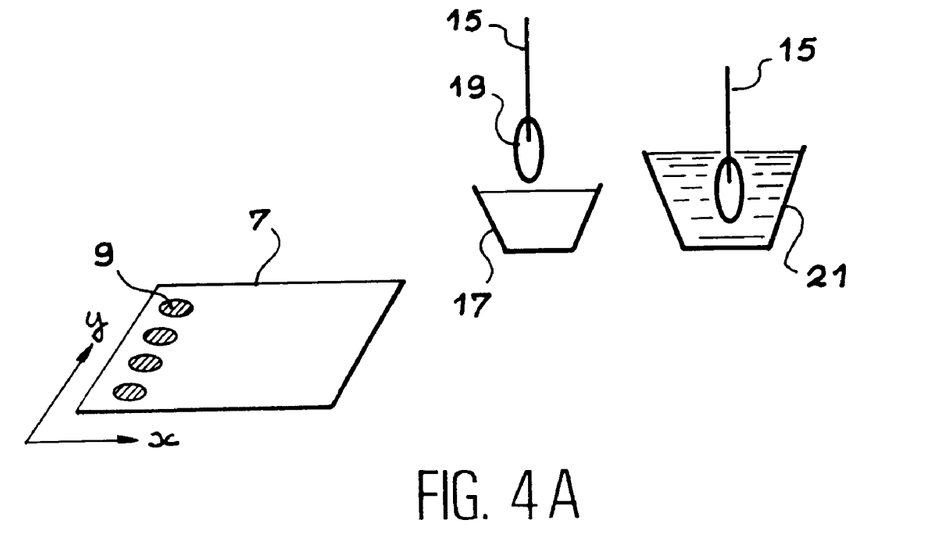
FIGS. 4A and 4B illustrate the necessary steps to achieve fixing of a ligand to a conductive carrier using an electrode in wire form.
Figure 4B:
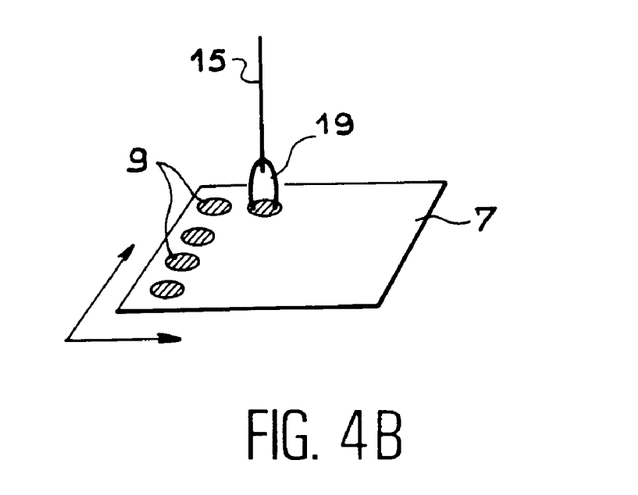

In FIGS. 4A and 4B another embodiment of the invention is shown in which the element able to dispense the ligand is formed by an electrode 15 in wire form.

In this case, a conductive carrier 7 can be used as shown in FIG. 4A. To make a ligand deposit, the electrode 15 is firstly immersed in a container 17 containing the ligand to be fixed and the electrode withholds a drop 19 of this ligand. The electrode containing the drop 19 of ligand is then brought above conductive carrier 7 as shown in FIG. 4B making electric contact by means of drop 19. By applying an electric impulse between electrode 15 and the conductive carrier 7 the formation of deposits of ligand is obtained.

After this operation, the electrode 15 is rinsed in a rinsing tank 21 so that it can be used again to make another deposit 9 either with the same ligand or with another ligand.

When this type of electrode is used, the resolution of the deposits may be lower but in this case the possible rinsing of electrode 15 is a determinant advantage.

The method of the invention is of great interest since it provides the possibility firstly of using a very small volume of reaction medium and therefore of economising the molecules of biological interest to be coupled. Also, the size of the deposits made on the carrier may be adjusted whereas in mechanical addressing methods involving conventional chemical activation methods the size of the deposits could not be less than 50, even 100 $\mu$m.

According to the invention, the size of the deposits can be very easily reduced not by reducing the size of the drop which is difficult in practice, but by reducing the surface of the zone that can be electroactivated. The resolution of the deposits is optimised through the fact that only the electrode/carrier interface located in the lines of the electric field can be activated; that is to say that if a drop spills outside this zone, its content will not be fixed to the conductive surface.

Therefore if the diameter of the interface between the nozzle 1a and the conductive carrier is 200 $\mu$m, and if a conductive zone is used whose side measurement is only 10 $\mu$m, only this conductive zone may be coated with the molecules of biological interest.

According to the invention, it is possible to make deposits 9 of different ligands on a carrier. This may be achieved by successively fixing at least two different ligands to different sites of the carrier using a single element and by changing the ligand dispensed by said element. In this case, the deposits may be made successively, either by changing the content of reservoir 1 of the elements shown in FIGS. 1 and 2, or by using the electrode in FIG. 4 which is immersed in different reagents. It is also possible to use a fixed reservoir provided with ligand adding and evacuation means, that is to say comprising a fluid inlet and outlet system for the ligand so as to change the content of the reservoir without having to move it.

Figure 5:
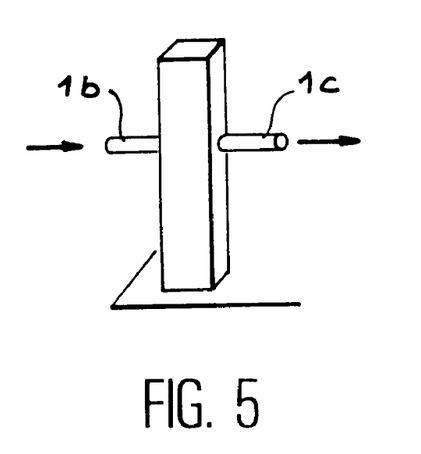
FIG. 5 shows a dispensing element, fitted with a fluid inlet and outlet to ensure its filling and draining, between two different ligand fixing operations.

FIG. 5 illustrates said embodiment of reservoir 1 provided with a fluid inlet 1b and an outlet 1c.

Evidently, it is also possible in order to make deposits 9 of identical or different ligands, to use several elements such as those shown in FIGS. 1 and 4. These elements may optionally be assembled to form a print head as shown in FIG. 6.

Figure 6:
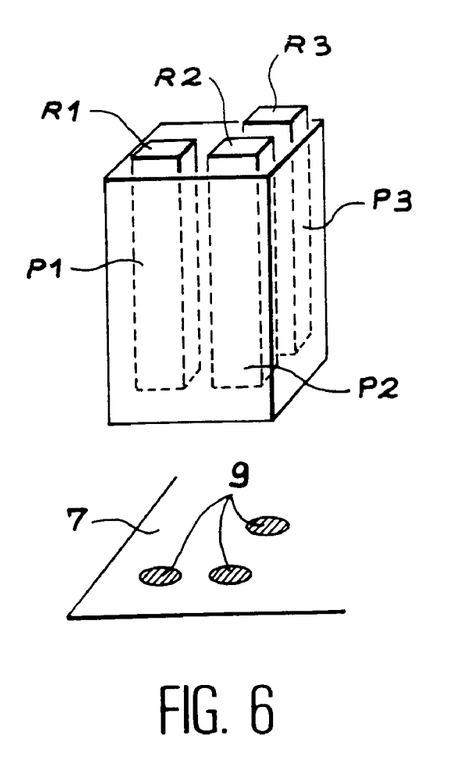
FIG. 6 is a diagram of a print head comprising several reservoirs for dispensing identical or different ligands.

In FIG. 6 it can be seen that the print head contains a first reservoir R1 filled with a ligand P1, a second reservoir R2 filled with a ligand P2 and a third reservoir R3 filled with a ligand P3. With a multiple head of this type it is possible to make three simultaneous deposits 9 of ligands P1, P2 and P3 respectively on the conductive surface 7.

It is specified that the deposits may be made in an inert atmosphere or in an electrochemically neutral liquid medium which, if possible, is non-miscible with the reaction medium contained in the reservoir.

After the depositing phase, the carrier may be rinsed and used in conventional manner.

The following examples illustrate the production of matrices of oligonucleotides or peptides using oligonucleotides or peptides carrying a pyrrole group which are fixed to a conductive carrier by copolymerising them with pyrrole by electrochemical route using the method described in document [5]: WO-A-94/22889.

EXAMPLE 1

1-Production of Carriers Carrying Oligonucleotides

The conductive carriers used are glass plates coated with a layer of chromium (for adherence) and a continuous layer of gold of 0.5 $\mu$m. This layer is connected to the "working electrode" outlet of an EGG 283 potentiostat.

Two different oligonucleotides carrying a pyrrole group at 5' are copolymerised on these carriers.

They were synthesized using the method described by Livache et al in [5].

To fix these oligonucleotides to the carrier, a reaction medium is used containing 0.1 M LiClo4, 20 mM pyrrole and 1 $\mu$M oligonucleotide carrying a pyrrole group at 5'.

This solution is added to a reservoir in polypropylene of cone shape which contains a platinum counter-electrode (CE) connected to the potentiostat. This reservoir is easily filled using a micropipette whose volume may vary from 50 to 1000 $\mu$l reaction medium. The tip of this cone has a diameter of approximately 0.8 mm. Finer or larger cones can be used for other volumes of reagent.

The tip of the cone is placed in contact with the conductive surface and the copolymer is made by cyclic voltametry (from −0.35 to +0.85V/CE at the rate of 100 mV/s). The charge recorded is used to determine the thickness of the polymer formed. After the formation of this first deposit, the cone is emptied, rinsed then filled with a new reaction medium containing another oligonucleotide. The conductive plate is moved (table x/y/z) and the same copolymerisation operation is conducted on another area of the conductive surface enabling the production of a deposit carrying another oligonucleotide sequence.

In this manner two matrices are prepared solely comprising pyrM5 oligonucleotides and two matrices solely comprising pyrCP oligonucleotides.

It is checked that the matrices of oligonucleotides so obtained have the desired properties for detecting complementary oligonucleotides by hybridisation.

2-Hybridisation of Oligonucleotides and Detection.

The complementary oligonucleotides tested are the following:

biotinylated complementary M5: $bio_{comp}M5$;
biotinylated complementary CP: $bio_{comp}CP$.

The hybridisation of the complementary oligonucleotides is conducted in PBS buffer (Sigma containing 0.5 M NaCl, 100 $\mu$g/ml salmon sperm DNA (Sigma), 10 mM EDTA and 10 nM of complementary biotinylated oligonucleotide. Hybridisation is conducted at 45° C. in a volume of 20 mm for 15 min. Quick rinsing in PBS/NaCl is made. Detection of the hybrids is then carried out after incubation in PBS/NaCl solution containing 0.1 mg/ml R phycoerythrine (Molecular Probe). Fluorescence is detected using a cold camera (Hamamatsu) mounted on an epifluoresence microscope. The results are expressed as shades of grey.

A spot of polypyrrole approximately 0.8 mm in diameter is observed whose fluorescent intensity is reported below:

oligonucleotide on pyrM5 carrier hybridised with $bio_{comp}$ M5: 110 oligonucleotide on pyrM5 carrier hybridised with $bio_{comp}$ CP: 5 oligonucloetide on pyrCP carrier hybridised with $bio_{comp}$ M5: 7 oligonucloetide on pyrCP carrier hybridised with $bio_{comp}$ CP: 84

Good hybridisation specificity is observed with a high signal/noise ratio.

EXAMPLE 2

The same operating method is followed as in example 1 to prepare matrices of pyrM5 and pyrCP oligonucleotides but using as conductive carrier a carrier in plastic material coated with indium and tin oxide (ITO).

The results obtained with these matrices for the detection of biotinylated complementary oligonucleotides are the following:

oligonucleotide on pyrM5 carrier hybridised with $bio_{comp}$ M5: 95 oligonucleotide on pyrM5 carrier hybridised with $bio_{comp}$ CP: 5 oligonucleotide on pyrCP carrier hybridised with $bio_{comp}$ M5: 7 oligonucleotide on pyrCP carrier hybridised with $bio_{comp}$ CP: 105

EXAMPLE 3

In this example, the same operating method as in example 1 is followed to prepare a matrix of pyrM5 oligonucleotides on a carrier in gold supported by glass but as counter-electrode a platinum wire is used charged with reaction medium instead of the reservoir fitted on the inside with a platinum electrode.

As shown in FIG. 4A, the platinum wire 15 is charged with reaction medium by immersion in a reservoir 17 containing this medium. The wire carrying the drop 19 is then brought to the carrier until contact is made with the drop. The electrochemical impulse is then made. The wire is lifted away and rinsed in water. Other deposits are made in the same manner. In this way deposits of approximately 1 mm in diameter are obtained and intense fluorescence is visible when the matrix is used to conduct hybridisation of the complementary oligonucleotide. The results obtained are the following:

oligonucleotide on pyrM5 carrier hybridised with $bio_{comp}M5$: 400 oligonucleotide on pyrCP carrier hybridised with $bio_{comp}$ CP: 10

EXAMPLE 4

In the same manner, peptides may be deposited. Pyrrole-peptides are synthesised using the procedure described by T. Livache et al, Biosensor and Bioelectronics 13, (1998) 629–634 [6]. They are deposited following the usual procedure ( ). The two peptides ACTH (18-39) and ACTH (11-24) are then detected by the biotinylated antibodies Mab (34-39) and Mab (18–24) respectively.

Fluorescence results after incubation with streptavidin phycoerythrine are the following:

| | |
|---|---|
| Peptide ACTH 18–39 with Mab 34–39 | 640 |
| Peptide ACTH 18–39 with Mab 18–24 | 510 |
| Peptide ACTH 11–24 with Mab 34–39 | 10 |
| Peptide ACTH 11–24 with Mab 18–24 | 470 |

CITED REFERENCES

[1] Fodor S. et al, Science, 1991, 251, pp. 767–773.
[2] Khrapko K. R. et al, DNA Sequence—I.DNA Sequencing and Mapping, 1991, vol. 1, pp. 375–388.
[3] GB-A-2 319 838.
[4] Livache T. et al, Nucleic Acids Res., 1994, 22, 15, pages 2915–2921
[5] WO-A-94/22889.
[6] T. Livache et al, Biosensors and Bioelectronics 13, (1998), pages 629–634.
[7] Emr S. and Yacynych A, Electroanalysis, 1995, 7, pp. 913–323.

What is claimed is:

1. A method for electrochemically fixing a matrix of deposits of a ligand on a plurality of sites of a conductive carrier or of conductive zones of a carrier, said method including use of an electrode and a carrier laterally movable relative to one another, said electrode being configured to distribute a discrete volume of a solution containing said ligand coupled to an electropolymerisable monomer, said method comprising the steps of:

a) positioning the electrode above one of said plurality of sites, b) distributing with the electrode on said one of said plurality of sites said discrete volume of a solution and simultaneously circulating an electric current from said electrode to said site to polymerize said electropolymerisable monomer so as to electrochemically fix the ligand on said one of said plurality of sites, d) repositioning the electrode over another of said plurality of sites via lateral movement relative to the carrier, and e) repeating said steps of distributing and simultaneously circulating an electrical current so as to form said matrix.

2. The method according to claim 1, wherein the electrode comprises:
a reservoir containing the solution, and
a conductive part.

3. The method according to claim 2, wherein the reservoir comprises:
means for filling said reservoir with said solution and evacuating said solution from said reservoir.

4. The method according to claim 1, wherein
the electrode comprises one of a wire electrode and a needle electrode configured to be charged externally with said solution of ligand coupled to the electropolymerisable monomer, and
said step of distributing comprises establishing a contact between the one of a wire electrode and a needle electrode and the one of said plurality of sites by a drop of said solution withheld on the one of a wire electrode and a needle electrode.

5. The method according to claim 1, wherein the conductive zones of a carrier are formed of zones of conductive material arranged on an insulating carrier.

6. The method according to claim 5, wherein the zones of conductive material are electrically interconnected.

7. The method according to claim 5, wherein the plurality of conductive zones comprises:
a conductive material chosen from the group consisting of gold, silver, platinum, indium and tin oxide (ITO), carbon, and conductive organic polymers.

8. The method according to claim 1, wherein the solution comprises:
a doping agent.

9. The method according to claim 1, wherein the electropolymerisable monomer is pyrrole.

10. The method according to claim 1, wherein the step of electrochemically fixing the ligand comprises:
fixing the ligand by electro-copolymerisation of both the electropolymerisable monomer and the ligand coupled to the electropolymerisable monomer.

11. The method according to claim 1, wherein the ligand comprises:
one of a nucleotide, an oligonucleotide, an amino acid, and a peptide.

12. A method for producing a matrix of deposits of different ligands electrochemically fixed on a plurality of sites of a conductive carrier or of conductive zones of a carrier, each site configured to receive a predetermined one of a plurality of different ligands, said method including the use of several electrodes and a carrier movable relative to one another, said electrodes configured to distribute a discrete volume of one of a plurality of solutions, each of said plurality of solutions containing one of a plurality of ligands coupled to an electropolymerisable monomer, said method comprising the steps of:

a) simultaneously or successively positioning two or more of said several electrodes above a corresponding two or more of said plurality of sites, b) distributing on each of said two or more of a plurality of sites said discrete volume of one of a plurality of solutions, and simultaneously circulating an electric current to said one of a plurality of sites to polymerize the electropolymerisable monomer within said one of a plurality of solutions so as to electrochemically fix the ligand within said one of a plurality of solutions on said two or more of a plurality of sites, d) repositioning said two or more of said several electrodes above a second corresponding two or more of said plurality of sites over another of said plurality of sites via lateral movement relative to the carrier, and e) repeating said steps of distributing and simultaneously circulating and electric current so as to form said matrix.

13. The method according to claim 12, wherein said two or more of said several electrodes comprises:

at least two electrodes arranged together in a print head.

14. The method according to claim 12, wherein each of said several electrodes comprises:

a reservoir configured to contain said discrete volume, and a conductive part.

15. The method according to claim 14, wherein the reservoir comprises:

means for filling said reservoir with said solution and evacuating said solution from said reservoir.

16. The method according to claim 12, wherein each of said plurality of several electrodes comprises one of a wire electrode and a needle electrode configured to be charged externally with said solution of ligand coupled to the electropolymerisable monomer, and said step of distributing comprises establishing a contact between the one of a wire electrode and a needle electrode and a corresponding site by a drop of said solution withheld on the one of a wire electrode and a needle electrode.

17. The method according to claim 12, wherein the conductive zones of the carrier are formed of zones of a conductive material arranged on an insulating carrier.

18. The method according to claim 17, wherein the zones of the conductive material are electrically interconnected.

19. The method according to claim 17, wherein the conductive material is chosen from the group consisting of gold, silver, platinum, indium and tin oxide (ITO), carbon, and conductive organic polymers.

20. The method according to claim 12, wherein each of said plurality of solutions comprise:

a doping agent.

21. The method according to claim 12, wherein the electropolymerisable monomer is pyrrole.

22. The method according to claim 12, wherein the step of electrochemically fixing the ligand comprises:

fixing the ligand by electro-copolymerization of both the electropolymerisable monomer and the ligand coupled to the electropolymerisable monomer.

23. The method according to claim 12, wherein the ligands are chosen from the group consisting of nucleotides, oligonucleotides, amino acids and peptides.

* * * * *